United States Patent
Jeong et al.

(10) Patent No.: US 8,948,287 B2
(45) Date of Patent: Feb. 3, 2015

(54) METHOD AND APPARATUS FOR TRANSMITTING AND RECEIVING DATA IN BROADCASTING SYSTEM

(75) Inventors: Hong-Sil Jeong, Seoul (KR); Se-Ho Myung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 61 days.

(21) Appl. No.: 13/532,197

(22) Filed: Jun. 25, 2012

(65) Prior Publication Data

US 2012/0327306 A1    Dec. 27, 2012

(30) Foreign Application Priority Data

Jun. 24, 2011    (KR) ................. 10-2011-0061869

(51) Int. Cl.
| | | |
|---|---|---|
| H04L 5/12 | (2006.01) | |
| H04L 23/02 | (2006.01) | |
| H04L 1/00 | (2006.01) | |
| H04L 1/18 | (2006.01) | |

(52) U.S. Cl.
CPC ............ *H04L 1/0045* (2013.01); *H04L 1/0041* (2013.01); *H04L 1/0057* (2013.01); *H04L 1/0065* (2013.01); *H04L 1/0071* (2013.01); *H04L 1/1819* (2013.01)
USPC ............................ 375/261; 375/259; 375/260

(58) Field of Classification Search
CPC .... H04L 1/0041; H04L 1/1819; H04L 1/0057
USPC .................. 375/261, 260, 259; 348/724, 726
See application file for complete search history.

(56) References Cited

U.S. PATENT DOCUMENTS

| | | | | |
|---|---|---|---|---|
| 2008/0232437 | A1* | 9/2008 | Kim et al. ...................... | 375/146 |
| 2008/0273452 | A1* | 11/2008 | Khan et al. .................... | 370/203 |
| 2011/0131464 | A1* | 6/2011 | Ko et al. ........................ | 714/752 |
| 2012/0127886 | A1* | 5/2012 | Kim et al. ..................... | 370/252 |

* cited by examiner

*Primary Examiner* — Erin File
(74) *Attorney, Agent, or Firm* — The Farrell Law Firm, P.C.

(57) ABSTRACT

Methods and apparatus are provided for transmitting data in a broadcasting system. Input data is encoded by an encoder. A first demultiplexer generates first transmission symbols using the encoded data. The first transmission symbols are modulated, and the modulated first transmission symbols are transmitted. A second demultiplexer generates second transmission symbols using at least a portion of the encoded data. The second transmission symbols are modulated and the modulated second transmission symbols are transmitted.

20 Claims, 8 Drawing Sheets

METHOD AND APPARATUS FOR TRANSMITTING AND RECEIVING DATA IN BROADCASTING SYSTEM

PRIORITY

This application claims priority under 35 U.S.C. §119(a) to a Korean Patent Application filed in the Korean Intellectual Property Office on Jun. 24, 2011 and assigned Serial No. 10-2011-0061869, the entire disclosure of which is incorporated herein by reference.

BACKGROUND OF THE INVENTION

1. Field of the Invention

The present invention relates generally to a method for transmitting and receiving channel codes to improve performance of broadcasting and communication systems, and more particularly, to a method and apparatus for mapping generated coded data to modulation symbols, and transmitting and receiving the mapped data.

2. Description of the Related Art

A powerful error-correction coding technique that supports broadband data and high-speed packet transmission is a key element in next-generation mobile communication systems and broadcasting systems. Since the turbo decoding method of 1993, interest in high-performance error-correcting codes showing error probability approaching the Shannon limit has increased, and IMT-2000 systems have employed turbo codes. The core technology of turbo codes is iterative decoding. Iterative decoding has evolved into a new realm of a high-performance decoding method, from which graph-based decoding methods have attracted attention. However, since turbo codes reach their performance limits at a very low error rate, which is required in $4^{th}$ generation mobile communication systems, the interest in new types of graph-based coding methods has increased. Error-correcting codes that have attracted attention due to this increased interest include a Low Density Parity Check Code (LDPC). The LDPC is a high-performance code that approaches the Shannon limit when a belief-propagation-based iterative decoding algorithm is used.

In situations where a Signal-to-Noise Ratio (SNR) is low or an error occurs frequently, a receiver may not restore input data from received coded data. Instead, a transmitter may transmit additional parity associated with the input data so that the receiver may utilize the parity in restoring the data.

When the additionally transmitted parity is not identical to the first transmitted coded data or any part thereof, the receiver performs decoding taking into account both the first transmitted coded data and the additionally transmitted parity, causing an increase in decoding complexity. In addition, when the additionally transmitted parity is the same as the first transmitted coded data or any part thereof, and data is transmitted in a simple iterative manner using the same modulation symbols, the decoding complexity may be low, but performance improvement may not meet the high standards that are desired.

SUMMARY OF THE INVENTION

The present invention has been made to address at least the above problems and/or disadvantages and to provide at least the advantages described below. Accordingly, an aspect of the present invention provides a method and apparatus for transmitting and receiving additional parity to improve performance of a receiver.

Another aspect of the present invention is to provide a decoding method and apparatus capable of improving reception performance without increasing the decoding complexity.

In accordance with one aspect of the present invention, a method is provided for transmitting data in a broadcasting system. Input data is encoded by an encoder. A first demultiplexer generates first transmission symbols using the encoded data. The first transmission symbols are modulated, and the modulated first transmission symbols are transmitted. A second demultiplexer generates second transmission symbols using at least a portion of the encoded data. The second transmission symbols are modulated and the modulated second transmission symbols are transmitted.

In accordance with another aspect of the present invention, a method is provided for receiving data in a broadcasting system. Coded first transmission symbols and coded second transmission symbols are received and demodulated. First and second decoder input values are calculated for decoding the demodulated first transmission symbols and the demodulated second transmission symbols, respectively. The first decoder input value for the first transmission symbols is combined with the second decoder input value for the second transmission symbols, and the combined decoder input values are decoded. The first transmission symbols are symbols obtained by demultiplexing a signal by a first demultiplexer, and the second transmission symbols are symbols obtained by demultiplexing a signal by a second demultiplexer using at least a portion of data which is input to the first demultiplexer.

In accordance with a further aspect of the present invention, an apparatus is provided for transmitting data in a broadcasting system. The apparatus includes an encoder for encoding input data. The apparatus also includes a first demultiplexer for generating first transmission symbols using the encoded data, and a second demultiplexer for generating second transmission symbols using at least a portion of the encoded data. The apparatus further includes a modulator for modulating the first transmission symbols and the second transmission symbols, and a transmitter for transmitting the modulated first transmission symbols and the modulated second transmission symbols.

In accordance with yet another aspect of the present invention, an apparatus is provided for receiving data in a broadcasting system. The apparatus includes a demodulator for receiving and demodulating coded first transmission symbols and coded second transmission symbols. The apparatus also includes a calculator for calculating first and second decoder input values for decoding the demodulated first transmission symbols and second transmission symbols, respectively. The apparatus further includes a decoder for combining the first decoder input value for the first transmission symbols with the second decoder input value for the second transmission symbols, and decoding the combined decoder input values. The first transmission symbols are symbols obtained by demultiplexing a signal by a first demultiplexer, and the second transmission symbols are symbols obtained by demultiplexing a signal by a second demultiplexer using at least a portion of data which is input to the first demultiplexer.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

An additional parity transmission method and apparatus for improving reception performance are described in detail below according to embodiments of the present invention.

Figure 1:
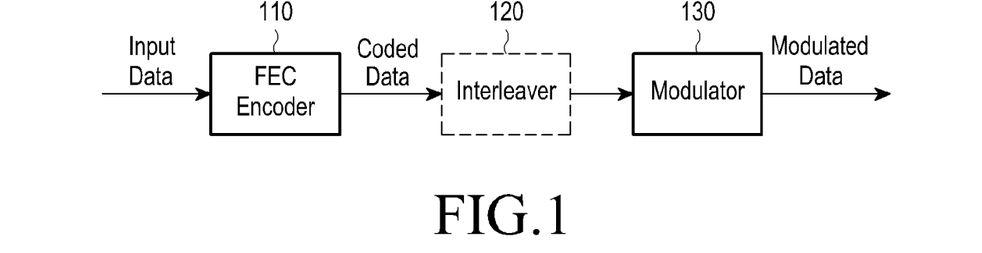
FIG. 1 is a diagram illustrating a channel encoding and modulation process.

FIG. 1 is a diagram illustrating a general channel encoding and modulation process.

Referring to FIG. 1, input data to be subjected to channel encoding is input to a channel encoder 110. The channel encoder 110 encodes the input data and outputs the coded data to a modulator 130. The modulator 130 modulates the coded data into modulation symbols and transmits the modulation symbols. Optionally, an interleaver 120 may be provided between the channel encoder 110 and the modulator 130, to match the coded data with an input format of the modulator 130, or for performance improvement or various other purposes. The modulator 130 generates modulation symbols and transmits the modulation symbols.

If an SNR is low or reception performance is poor, performance of a receiver may be improved by generating additional parity for the input data and transmitting the additional parity. The term 'additional parity', as used herein, may refer to additional information related to the input data. The additional information may refer to the input data itself, the first coded data obtained with the input data, or the newly coded data that can be obtained with the input data. The data obtained by encoding the input data in the same way may be retransmitted in the same modulation symbols using the same interleaver and the same modulator. However, this simple iteration has limitations on performance improvement because it cannot obtain an additional coding gain.

Figure 2:
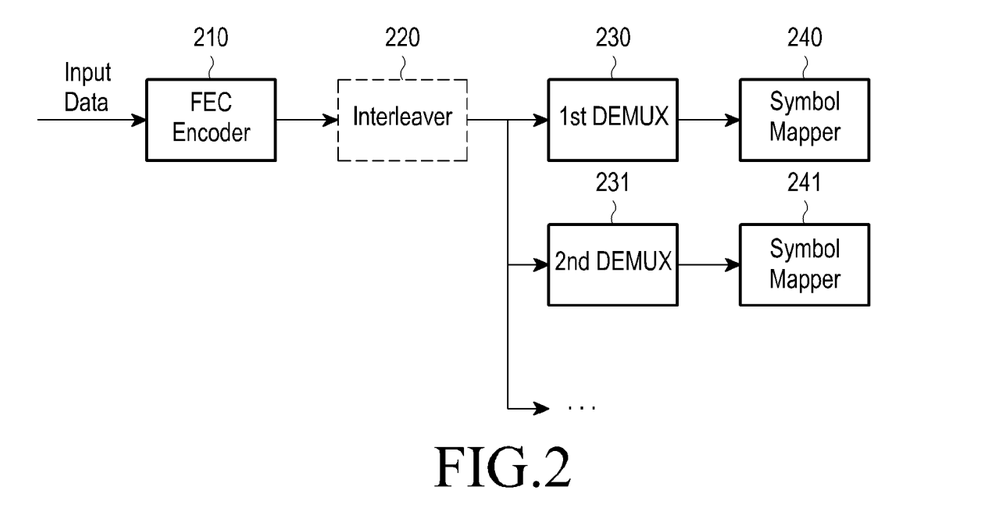
FIG. 2 is a diagram illustrating a first additional parity transmission method, according to an embodiment of the present invention.
Figure 3:
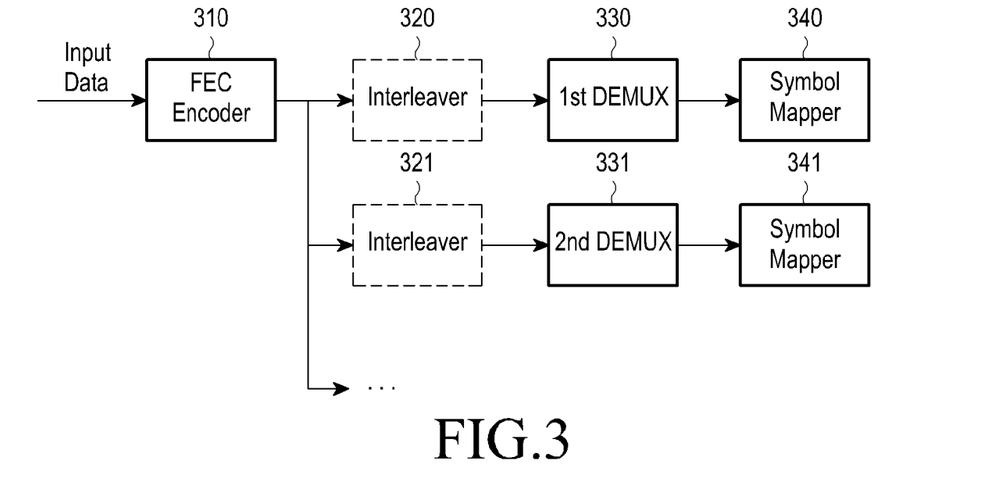
FIG. 3 is a diagram illustrating a second additional parity transmission method, according to an embodiment of the present invention.

Additional parity transmission methods are shown in FIGS. 2 and 3, according to embodiments of the present invention.

Referring first to FIG. 2, an encoder 210 outputs coded data by encoding input data, and the coded data passes through an interleaver 220, if necessary. A first demultiplexer (DEMUX) 230 generates first transmission symbols by demultiplexing the coded data or interleaved coded data, and transmits the first transmission symbols via a first symbol mapper 240.

To improve reception performance, a second demultiplexer 231, which is different from the first demultiplexer 230, generates second transmission symbols by demultiplexing all or some of the coded data or interleaved coded data, and transmits the second transmission symbols via a second symbol mapper 241. If necessary, this process may be repeated.

Referring next to FIG. 3, input data is encoded at an encoder 310, and the coded data is interleaved, if necessary. The coded data is input to a first demultiplexer 330 via a first interleaver 320, and the first demultiplexer 330 generates first transmission symbols by demultiplexing the coded data. The first demultiplexer 330 transmits the first transmission symbols via a first symbol mapper 340.

To improve reception performance, all or some of the coded data is input to a second demultiplexer 331, which is different from the first demultiplexer 330, via a second interleaver 321. The second demultiplexer 331 generates second transmission symbols by demultiplexing all or some of the coded data. The second demultiplexer 331 transmits the second transmission symbols via a symbol mapper 341. If necessary, this process may be repeated.

In the methods of FIGS. 2 and 3, the first demultiplexer and the second demultiplexer, or the first interleaver and the second interleaver may vary depending on a modulation scheme. It is not necessary to apply the same modulation scheme to the first transmission symbols and the second transmission symbols.

In the additional parity transmission methods shown in FIG. 2 or FIG. 3, it should be noted that the second transmission symbols may be generated using all or some of the coded data or interleaved coded data.

The use of the first demultiplexer and the second demultiplexer in different ways is better at improving performance than using the first demultiplexer and the second demultiplexer in the same way, as described in detail below.

When a modulation order is 4 or more, i.e., when a modulation scheme higher than Quadrature Phase-Shift Keying (QPSK) is used, bits constituting modulation symbols are not generally uniform in reliability. For example, when a 16-ary Quadrature Amplitude Modulation (16QAM) modulation scheme is used, one 16QAM modulation symbol includes 4 bits, and among them, two bits are much higher in reliability than the other two bits. Therefore, as for a Log-Likelihood Ratio (LLR) value indicating reliability, that a receiver calculates by performing demodulation when 16QAM symbols are transmitted for the coded data twice using the same demultiplexers, bits obtained at first transmission and having high LLR values have high LLR values on average even at second transmission. In contrast, bits obtained at first transmission and having low LLR values have low LLR values on average even at second transmission. This relationship is due to the fact that the same reliabilities are likely to be delivered due to the use of the same demultiplexers.

Since the methods shown in FIGS. 2 and 3 use the first demultiplexer and the second demultiplexer in different ways, a transmitter may adjust reliabilities of bits of coded data received at a receiver. Coding performance is likely to be improved by properly adjusting reliabilities of bits of the coded data. In addition, the same decoder may be used, preventing an increase in the decoding implementation and computation complexity.

Embodiments of the present invention increase reliabilities of some bits of coded data, which are mapped to low-reliability bits, using the first demultiplexer, and use the second demultiplexer to decrease reliabilities of some bits of coded data, which are mapped to high-reliability bits. More specifically, the second demultiplexer in the embodiments of the present invention is configured to change its outputs such that one or more bits among outputs of the first demultiplexer, which correspond to high-reliability bits, may correspond to low-reliability bits, and is configured to change its output such that one or more bits among output of the first demultiplexer, which correspond to low-reliability bits, may correspond to high-reliability bits.

Examples of improved performance are described in detail below.

In FIGS. 2 and 3, a channel encoder uses a concatenated code of a Boss-Chaudhuri-HocQuenghen (BCH) code and a Low Density Parity Check Code (LDPC) code, which is used in Digital Video Broadcasting (DVB) systems, such as, for example, DVB-Satellite-Second Generation (DVB-S2), DVB-Terrestrial 2 (DVB-T2), DVB-Cable 2 (DVB-C2), and DVB-Next Generation Handheld (DVB-NGH). It is assumed herein that the LDPC code has a code rate of 2/3 and a length of 16,200, and is defined as the following sequence:

2084 1613 1548 1286 1460 3196 4297 2481 3369 3451 4620 2622
1 122 1516 3448 2880 1407 1847 3799 3529 373 971 4358 3108
2 259 3399 929 2650 864 3996 3833 107 5287 164 3125 2350
3 342 3529
4 4198 2147
5 1880 4836
6 3864 4910
7 243 1542
8 3011 1436
9 2167 2512
10 4606 1003
11 2835 705
12 3426 2365
13 3848 2474
14 1360 1743
0 163 2536
1 2583 1180
2 1542 509
3 4418 1005
4 5212 5117
5 2155 2922
6 347 2696
7 226 4296
8 1560 487
9 3926 1640
10 149 2928
11 2364 563
12 635 688
13 231 1684
14 1129 3894

It is also assumed herein that the interleaving scheme and the demultiplexing scheme used herein are the same as those applied in DVB systems, such as DVB-T2. For example, when 16QAM is used as a modulation scheme and an LDPC code with a code rate of 2/3 is used, a sequence representing the first demultiplexer is as follows in Table 1:

TABLE 1

| Modulation format | 16-QAM | | | | | | | |
|---|---|---|---|---|---|---|---|---|
| Input bit-number, di mod $N_{substreams}$ | 0 | 1 | 2 | 3 | 4 | 5 | 6 | 7 |
| Output bit-number, e | 7 | 1 | 4 | 2 | 5 | 3 | 6 | 0 |

The second transmission symbols are generated using the second demultiplexer as defined in Table 2 or 3 below by applying the 16QAM modulation scheme in the same way.

TABLE 2

| Modulation format | 16-QAM | | | | | | | |
|---|---|---|---|---|---|---|---|---|
| Input bit-number, di mod $N_{substreams}$ | 0 | 1 | 2 | 3 | 4 | 5 | 6 | 7 |
| Output bit-number, e | 5 | 3 | 6 | 0 | 7 | 1 | 4 | 2 |

TABLE 3

| Modulation format | 16-QAM | | | | | | | |
|---|---|---|---|---|---|---|---|---|
| Input bit-number, di mod $N_{substreams}$ | 0 | 1 | 2 | 3 | 4 | 5 | 6 | 7 |
| Output bit-number, e | 2 | 3 | 6 | 0 | 7 | 1 | 4 | 5 |

In Tables 1, 2 and 3, the first row refers to the input order of the demultiplexer. When numbers in the second row are 0, 1, 4 and 5, it means that their bits correspond to high-reliability bits in a 16QAM symbol. When numbers in the second row are 2, 3, 6 and 7, it means that their bits correspond to low-reliability bits in a 16QAM symbol.

In Table 1, 0 and $1^{st}$ DEMUX inputs correspond to a low-reliability bit and a high-reliability bit, respectively. In contrast, in Table 2, 0 and $1^{st}$ DEMUX inputs correspond to a high-reliability bit and a low-reliability bit, respectively. Further, in Table 1, $1^{st}$ and $5^{th}$ DEMUX inputs correspond to a high-reliability bit and a low-reliability bit, respectively. In contrast, in Table 3, $1^{st}$ and $5^{th}$ DEMUX inputs correspond to a low-reliability bit and a high-reliability bit, respectively.

It is to be noted that Tables 2 and 3 may be converted into several DEMUXs having the same reliability mapping rule. For example, for 0, 1, 4 and 5, their reliability mapping rule is not changed even though the numbers are changed with each other. Also, for 2, 3, 6 and 7, their reliability mapping rule is not changed even though the numbers are changed with each other.

Figure 4:
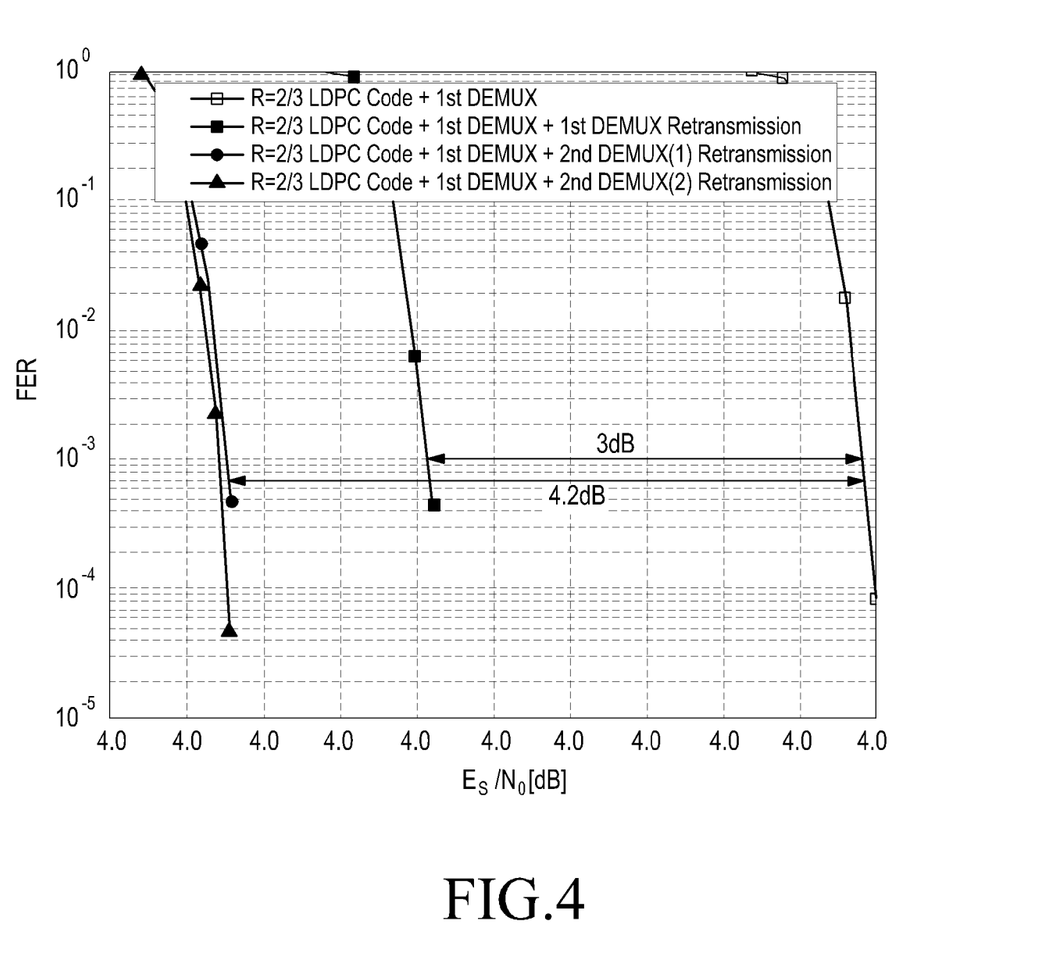
FIG. 4 is a chart showing performance improvement, according to an embodiment of the present invention.

FIG. 4 is a chart showing decoding performance curves obtained by properly combining received symbols in a receiver after a transmitter transmits coded data generated by encoding an LDPC code with a code rate of 2/3 and a length of 16,200 using Tables 1, 2 and 3 by applying the method shown in Table 2 or 3. A channel is assumed to be an Additive White Gaussian Noise (AWGN) channel.

Figure 5A:
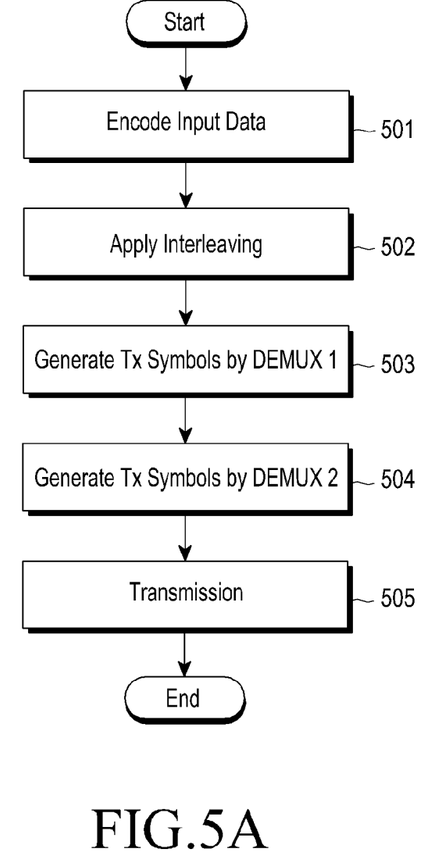
FIGS. 5A and 5B are diagrams illustrating transmission and decoding processes, according to an embodiment of the present invention.
Figure 5B:
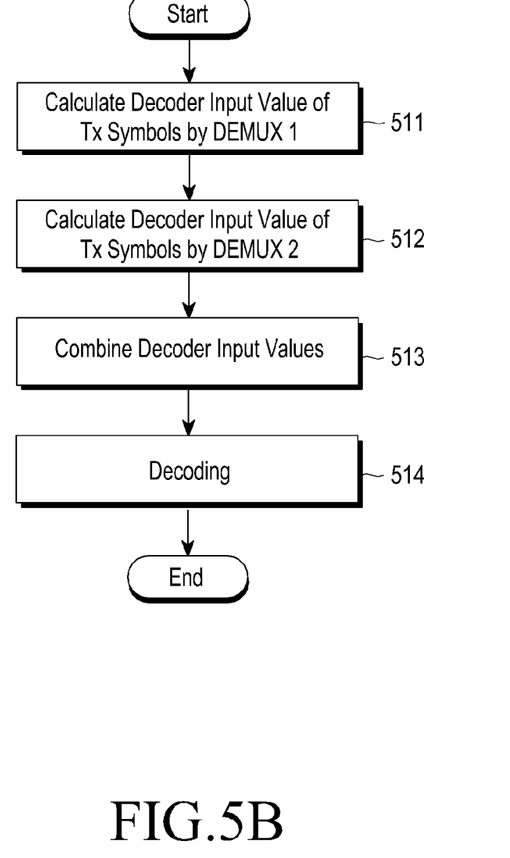

FIGS. 5A and 5B are diagrams illustrating transmission and decoding processes, according to an embodiment of the present invention.

A transmission process is shown in FIG. 5A. Input data is encoded, in step 501, and the encoded data is interleaved, in step 502. First transmission symbols are generated by a first demultiplexer, in step 503, and second transmission symbols are generated by a second demultiplexer, in step 504. The first transmission symbols and the second transmission symbols are transmitted, in step 505. Steps 503 and 504 are interchangeable depending on the system.

A decoding process is shown in FIG. 5B. Decoder input values (normally LLRs) for decoding transmission symbols generated by the first demultiplexer are calculated, in step 511. Decoder input values (LLRs) for decoding transmission symbols generated by the second demultiplexer are calculated, in step 512. The two values are combined, in step 513. Decoding is performed, in step 514. Steps 511 and 512 are interchangeable depending on the systems.

It can be understood from FIG. 4 that performance improvement of about 3 dB may be obtained when first and second transmission symbols are transmitted using the same first demultiplexer, whereas performance improvement of about 4.2 dB may be obtained when first and second transmission symbols are respectively transmitted using different demultiplexers, i.e. a first demultiplexer and a second demultiplexer. In other words, the latter case may have performance improvement of 1.2 dB, compared to the former case of using the same demultiplexer.

However, the actual channel environment is commonly not an AWGN channel environment, and has very different characteristics over time. For these reasons, normal channel-coded data may be transmitted by being spread over time, making it possible to achieve time diversity.

A process of transmitting additional parity over time in a DVB-T2 system is described with reference to FIG. 6, according to an embodiment of the present invention. Although it is assumed in FIG. 6 that a Common Physical Layer Pipe (PLP) including data shared with a plurality of PLPs is transmitted, the same method may be applied even when Data PLPs for a specific PLP are transmitted.

Figure 6:
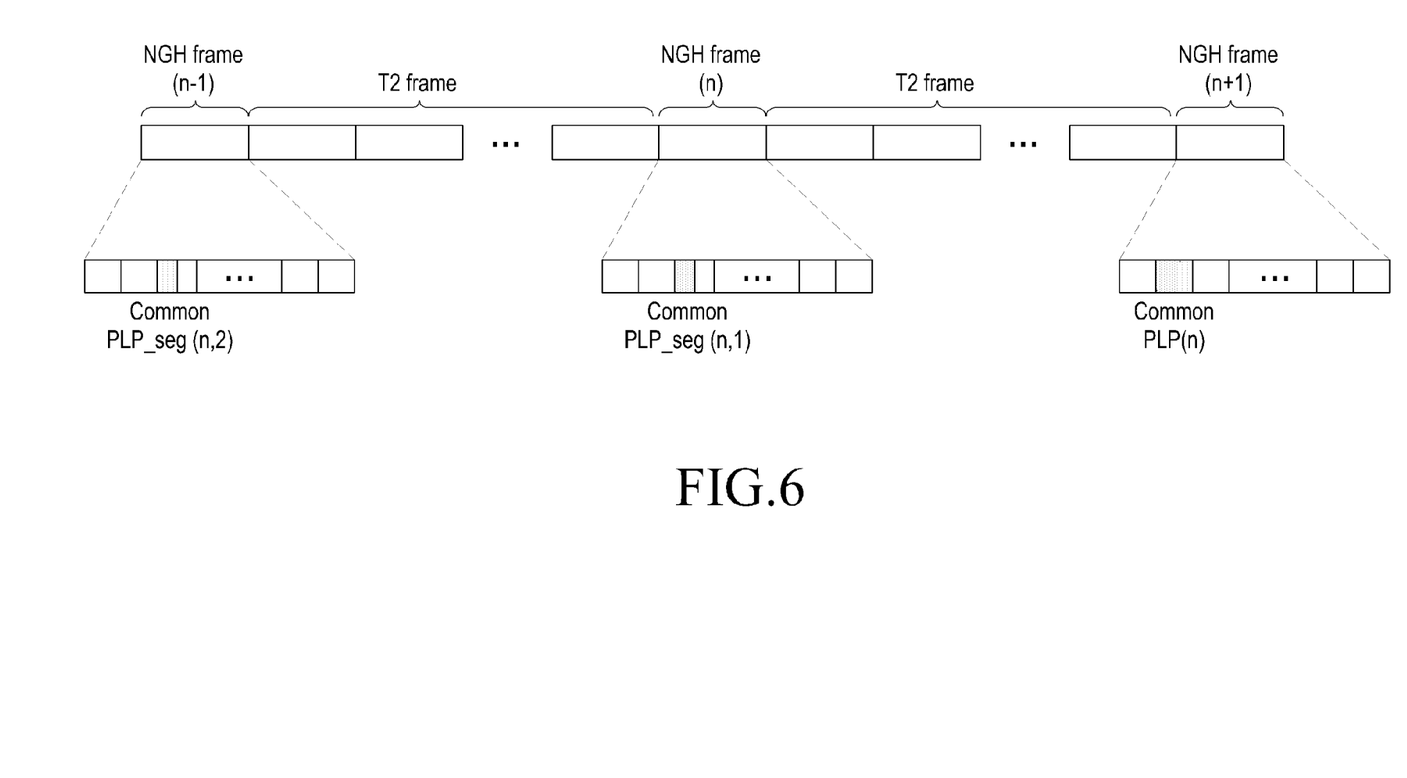
FIG. 6 is a diagram illustrating a method for transmitting additional parity over time, according to an embodiment of the present invention.

As shown in FIG. 6, it is assumed that a DVB-T2 signal and a DVB-NGH signal are transmitted by being separated in time, and desired data is transmitted in an (n+1)-th frame of the DVB-NGH system. A portion represented as Common PLP (n) in FIG. 6 corresponds thereto. This data is the coded data that is generated and transmitted by the first demultiplexer in FIGS. 2 and 3. The coded data is additionally transmitted using the second demultiplexer, to make the data robust against the channel conditions.

An embodiment of the present invention transmits the symbols to be generated and transmitted by the second demultiplexer in an (n−1)-th frame and an n-th frame ahead of the (n+1)-th frame, as shown in FIG. 6. In FIG. 6, Common PLP_seg (n,2) and Common PLP_seg (n,1) correspond thereto.

Figure 7:
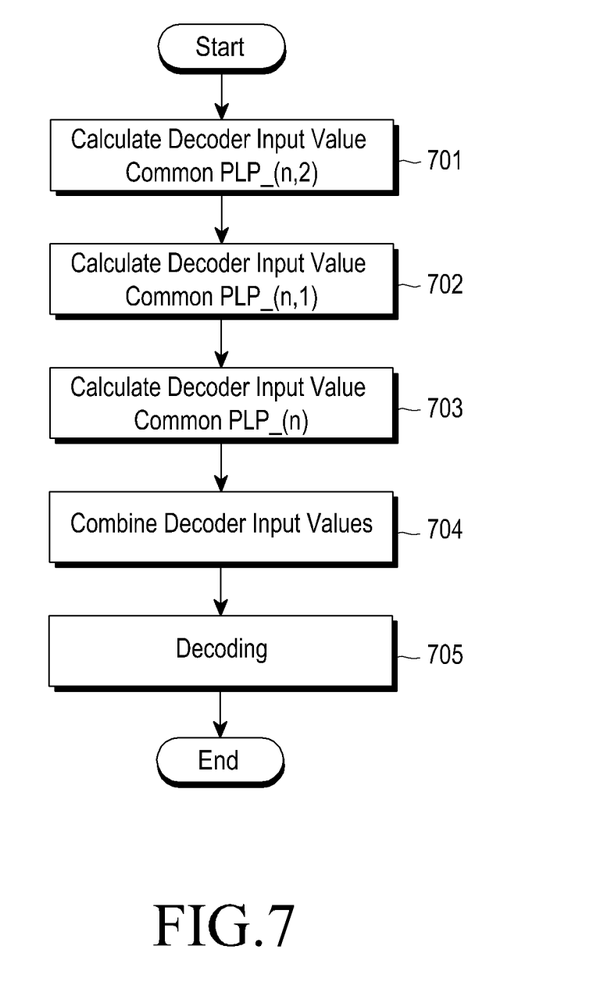
FIG. 7 is a diagram illustrating a decoding process, according to an embodiment of the present invention.

A receiver may restore desired data in an operation shown in FIG. 7, according to an embodiment of the present invention.

The receiver calculates a decoder input value for a Common PLP_seg (n, 2) signal, in step 701. The receiver calculates a decoder input value for a Common PLP_seg (n, 1) signal, in step 702. The receiver calculates a decoder input value for a Common PLP (n) signal, in step 703. The receiver combines the calculated decoder input values, in step 704, and decodes the combined decoder input values, in step 705. Steps 701, 702 and 703 are interchangeable depending on the system.

Figure 8:
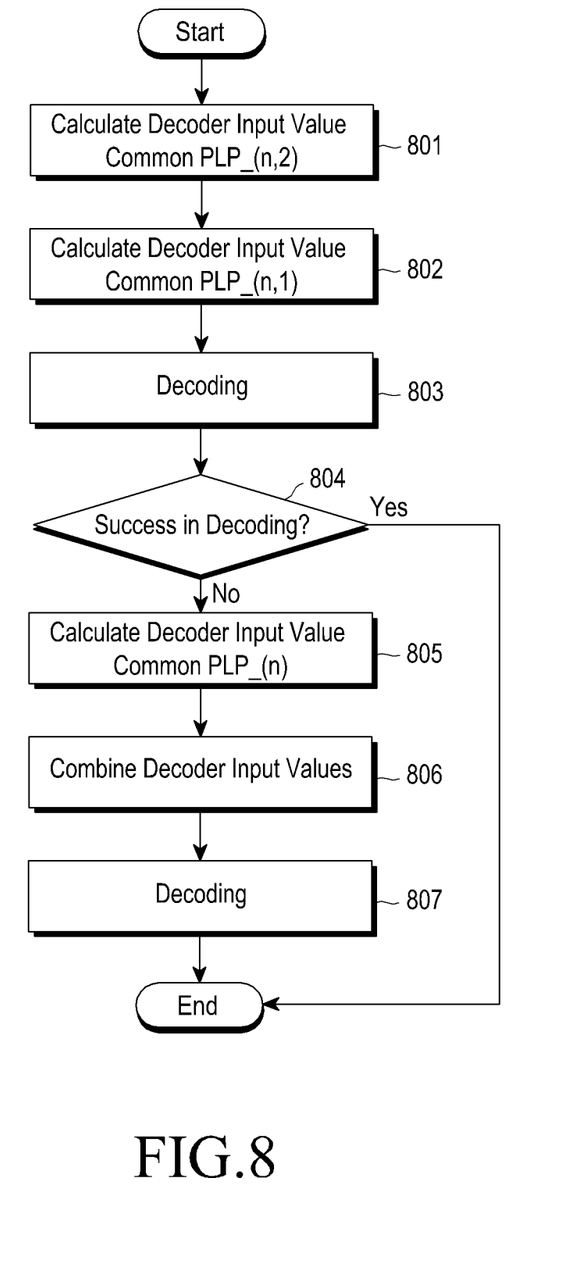
FIG. 8 is a diagram illustrating a decoding process, according to an embodiment of the present invention.

According to an embodiment of the present invention, Common PLP_seg (n, 2) and Common PLP_seg (n, 1) may be decoded through the process shown in FIG. 8, since they may be regarded as coded data.

More specifically, the receiver calculates a decoder input value for a Common PLP_seg (n, 2) signal, in step 801. The receiver calculates a decoder input value for a Common PLP_seg (n, 1) signal, in step 802. In step 803, the receiver decodes the decoder input values calculated in steps 801 and 802. It is determined, in step 804, whether the decoding is successful. If the decoding is successful, the receiver ends the decoding procedure. If the decoding failed, the receiver calculates a decoder input value for a Common PLP (n) signal, in step 805. In step 806, the receiver combines the decoder input values calculated in steps 801, 802 and 805, and then decodes the combined decoder input values in step 807. Steps 801 and 802 are interchangeable depending on the system.

Although an embodiment of the present invention transmits the symbols to be generated and transmitted by the second demultiplexer in an (n−1)-th frame and an n-th frame ahead of the (n+1)-th frame as shown in FIG. 6, the symbols may be generally transmitted in a frame further ahead of or further behind the (n+1)-th frame. It is to be noted that the Common PLP (n) signal may be replaced with various different information signals depending on a purpose of the system.

Figure 12:
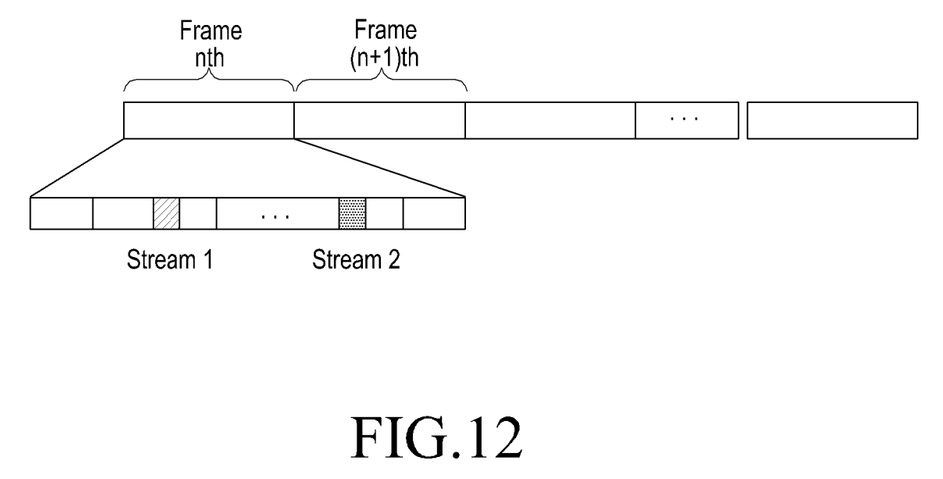
FIG. 12 is a diagram illustrating a transmission method, according to another embodiment of the present invention.

FIG. 12 is a diagram illustrating a case where a stream generated by the first demultiplexer and a stream generated by the second demultiplexer are transmitted in the same frame, according to another embodiment of the present invention.

When one broadcasting system supports both a fixed receiver and a mobile receiver, the mobile receiver requires a more-robust transmission scheme because it has poor channel conditions compared to the fixed receiver. Therefore, a transmitter uses a lower code rate or a lower modulation scheme.

The transmitter is set to transmit both the first stream and the second stream. The fixed receiver decodes input bits from a Forward Error Correction (FEC) encoder based on the first stream among the received first stream and second stream. It will be understood by those of ordinary skill in the art that the fixed receiver may decode the input bits based on both the first stream and the second stream. The mobile receiver decodes input bits from the FEC encoder based on both the received first stream and second stream. The phrase 'decoding input bits based on a stream' as used herein may refer to calculating LLR values of bits constituting a received stream.

When the transmitter transmits the first stream and the second stream, a position of each stream in a frame is variable. More specifically, the first stream may be transmitted in a preceding frame compared to the second stream, or the second stream may be transmitted in a preceding frame compared to the first stream. In addition, the first stream and the second stream may be transmitted in the same frame as shown in FIG. 12, or may be transmitted in different frames. When the first stream and the second stream are transmitted in different frames, diversity effect may be achieved, but delay may occur during decoding.

Figure 9:
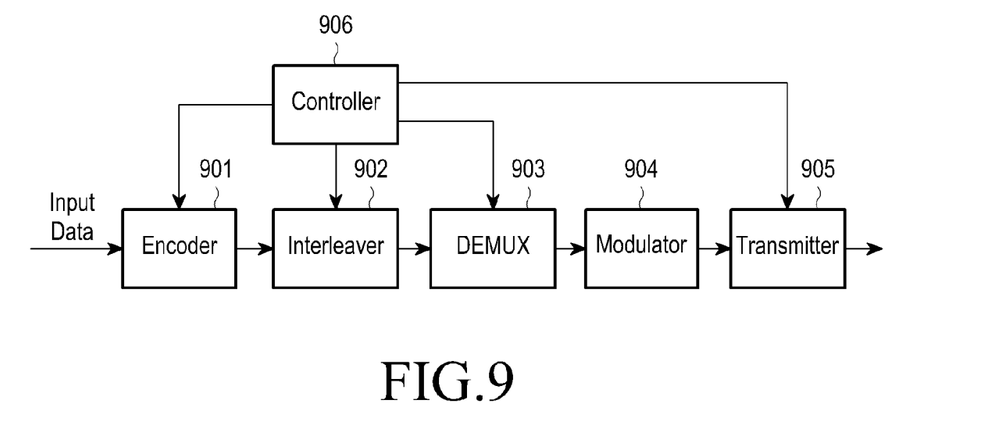
FIG. 9 is a diagram illustrating a structure of a transmitter, according to an embodiment of the present invention.
Figure 10:
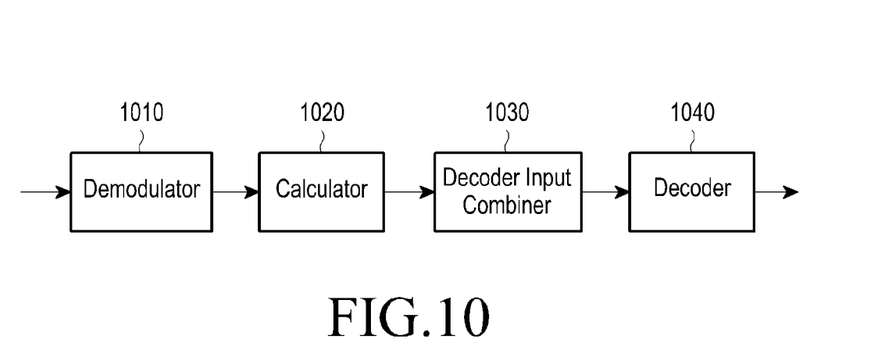
FIG. 10 is a diagram illustrating a structure of a receiver, according to an embodiment of the present invention.

FIGS. 9 and 10 show a transmission apparatus and a reception apparatus, according to an embodiment of the present invention.

Referring to FIG. 9, an encoder 901 encodes input data, and a controller 906 controls an operation of an interleaver 902 depending on a modulation scheme and the amount of coded data to be transmitted, and applies interleaving to the coded data. Similarly, the controller 906 controls an operation of a demultiplexer 903 depending on the modulation scheme and applies demultiplexing to the coded data. Thereafter, a modulator 904 performs modulation and a transmitter 905 transmits the modulated data. The controller 906 controls the interleaver 902 and the demultiplexer 903 to apply first interleaving and second interleaving, and first demultiplexing and second demultiplexing according to an embodiment of the present invention. When transmitting data by spreading it over time for the purpose of achieving time diversity, the controller 906 may control the transmitter 905 to transmit data by properly spreading it.

Referring to FIG. 10, a demodulator 1010 demodulates a received signal, and a calculator 1020 calculates decoder input values. A decoder input combiner 1030 properly combines the calculated decoder input values, and a decoder 1040 decodes the combined input values.

Figure 11:
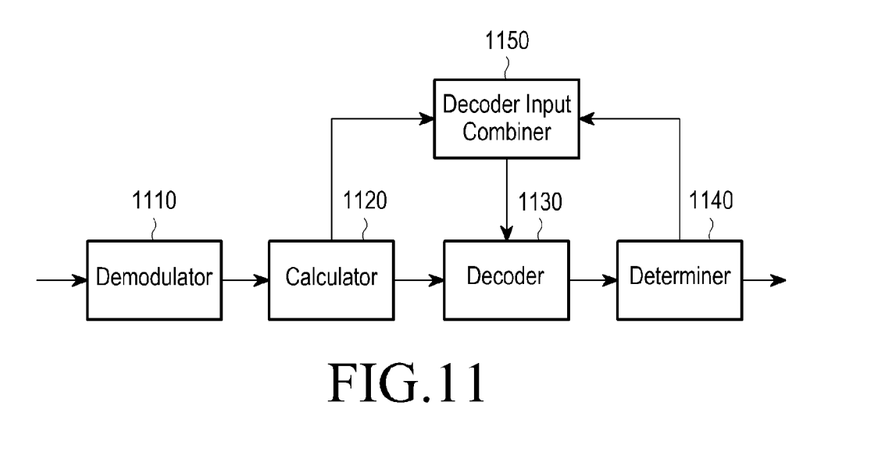
FIG. 11 is a diagram illustrating a structure of a receiver, according to another embodiment of the present invention.

FIG. 11 is a diagram illustrating a receiver, according to another embodiment of the present invention.

Referring to FIG. 11, a demodulator 1110 demodulates a received signal, and a calculator 1120 calculates decoder input values. A decoder 1130 decodes some of the calculated decoder input values. A determiner 1140 determines whether the decoding is successful. If the decoding is successful, the determiner 1140 ends the decoding procedure. If the decoding failed, a decoder input combiner 1150 properly combines the decoder input values received from the calculator 1120, and the decoder 1130 decodes the combined input values. This process may be repeated until there are no more decoder input values to be combined.

As is apparent from the foregoing description, additional parity may be efficiently transmitted in a low-SNR area, making it possible to improve reception performance without increasing the decoding complexity.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for transmitting data in a broadcasting system, comprising the steps of:
    encoding input data by an encoder;
    generating, by a first demultiplexer, first transmission symbols using the encoded data, modulating the first transmission symbols, and transmitting the modulated first transmission symbols; and
    generating, by a second demultiplexer, second transmission symbols using at least a portion of the encoded data, modulating the second transmission symbols, and transmitting the modulated second transmission symbols,
    wherein the first demultiplexer and the second demultiplexer are determined depending on a modulation scheme applied to the first transmission symbols and the second transmission symbols.

2. The method of claim 1, wherein the first transmission symbols and the second transmission symbols are transmitted at different transmission times when the first transmission symbols and the second transmission symbols are transmitted in a same frame.

3. The method of claim 1, wherein the encoder comprises a concatenated encoder of a Bose-Chaudhuri-HocQuenghem (BCH) code and a Low Density Parity Check Code (LDPC) code.

4. The method of claim 1, further comprising, after encoding the input data, interleaving the encoded data, and outputting the interleaved data to the first demultiplexer and the second demultiplexer.

5. The method of claim 4, wherein the encoded data is interleaved using a first interleaver and a second interleaver, which are determined depending on the modulation scheme applied to the first transmission symbols and the second transmission symbols.

6. The method of claim 1, wherein the second demultiplexer changes outputs thereof such that one or more bits among outputs of the first demultiplexer, which correspond to high-reliability bits, may correspond to low-reliability bits, and changes outputs thereof such that one or more bits among outputs of the first demultiplexer, which correspond to low-reliability bits, may correspond to high-reliability bits.

7. An apparatus for transmitting data in a broadcasting system, comprising:
    an encoder for encoding input data;
    a first demultiplexer for generating first transmission symbols using the encoded data; and
    a second demultiplexer for generating second transmission symbols using at least a portion of the encoded data;
    a modulator for modulating the first transmission symbols and the second transmission symbols; and
    a transmitter for transmitting the modulated first transmission symbols and the modulated second transmission symbols,
    wherein the first demultiplexer and the second demultiplexer are determined depending on a modulation scheme applied to the first transmission symbols and the second transmission symbols.

8. The apparatus of claim 7, wherein the transmitter transmits the first transmission symbols and the second transmission symbols at different transmission times when the first transmission symbols and the second transmission symbols are transmitted in a same frame.

9. The apparatus of claim 7, wherein the encoder comprises a concatenated encoder of a Bose-Chaudhuri-HocQuenghem (BCH) code and a Low Density Parity Check Code (LDPC) code.

10. The apparatus of claim 7, further comprising an interleaver unit for interleaving the encoded data, and outputting the interleaved data to the first demultiplexer and the second demultiplexer.

11. The apparatus of claim 10, wherein the interleaver unit comprises a first interleaver and a second interleaver, and the first interleaver and the second interleaver are determined depending on the modulation scheme applied to the first transmission symbols and the second transmission symbols.

12. The apparatus of claim 7, wherein the second demultiplexer changes outputs thereof such that one or more bits among outputs of the first demultiplexer, which correspond to high-reliability bits, may correspond to low-reliability bits, and changes outputs thereof such that one or more bits among outputs of the first demultiplexer, which correspond to low-reliability bits, may correspond to high-reliability bits.

13. A method for receiving data in a broadcasting system, comprising the steps of:
    receiving and demodulating coded first transmission symbols and coded second transmission symbols;
    calculating first and second decoder input values for decoding the demodulated first transmission symbols and the demodulated second transmission symbols; and
    combining the first decoder input value for the first transmission symbols with the second decoder input value for the second transmission symbols, and decoding the combined decoder input values;
    wherein the first transmission symbols are symbols obtained by demultiplexing a signal by a first demultiplexer, and the second transmission symbols are symbols obtained by demultiplexing a signal by a second demultiplexer using at least a portion of data which is input to the first demultiplexer, and
    wherein the first demultiplexer and the second demultiplexer are determined depending on a modulation scheme applied to the first transmission symbols and the second transmission symbols.

14. The method of claim 13, wherein the first transmission symbols and the second transmission symbols are received at different transmission times when the first transmission symbols and the second transmission symbols are received in a same frame.

15. The method of claim 13, wherein the first transmission symbols and the second transmission symbols are symbols obtained by encoding a signal by a concatenated encoder of a Bose-Chaudhuri-HocQuenghem (BCH) code and a Low Density Parity Check Code (LDPC) code.

16. The method of claim 13, wherein the second demultiplexer changes outputs thereof such that one or more bits among outputs of the first demultiplexer, which correspond to high-reliability bits, may correspond to low-reliability bits, and changes outputs thereof such that one or more bits among outputs of the first demultiplexer. which correspond to low-reliability bits, may correspond to high-reliability bits.

17. An apparatus for receiving data in a broadcasting system, comprising:
    a demodulator for receiving and demodulating coded first transmission symbols and coded second transmission symbols;
    a calculator for calculating first and second decoder input values for decoding the demodulated first transmission symbols and second transmission symbols; and
    a decoder for combining the first decoder input value for the first transmission symbols with the second decoder input value for the second transmission symbols, and decoding the combined decoder input values;
    wherein the first transmission symbols are symbols obtained by demultiplexing a signal by a first demultiplexer, and the second transmission symbols are symbols obtained by demultiplexing a signal by a second demultiplexer using at least a portion of data which is input to the first demultiplexer, and
    wherein the first demultiplexer and the second demultiplexer are determined depending on a modulation scheme applied to the first transmission symbols and the second transmission symbols.

18. The apparatus of claim 17, wherein the first transmission symbols and the second transmission symbols are received at different transmission times when the first transmission symbols and the second transmission symbols are received in a same frame.

19. The apparatus of claim 17, wherein the first transmission symbols and the second transmission symbols are symbols obtained by encoding a signal by a concatenated encoder of a Bose-Chaudhuri-HocQuenghem (BCH) code and a Low Density Parity Check Code (LDPC) code.

20. The apparatus of claim 17, wherein the second demultiplexer changes outputs thereof such that one or more bits among outputs of the first demultiplexer, which correspond to high-reliability bits, may correspond to low-reliability bits, and changes outputs thereof such that one or more bits among outputs of the first demultiplexer, which correspond to low-reliability bits, may correspond to high-reliability bits.

* * * * *